United States Patent
He et al.

(10) Patent No.: US 12,492,287 B2
(45) Date of Patent: Dec. 9, 2025

(54) ORGANIC FRAME MATERIAL HAVING ZINC CONTAINING ISO-MOLYBDIC ACID METAL, METHOD OF MANUFACTURING THE SAME, AND APPLICATION THEREOF

(71) Applicant: Changzhou University, Changzhou (CN)

(72) Inventors: Mingyang He, Changzhou (CN); Qun Chen, Changzhou (CN); Junfeng Qian, Changzhou (CN); Shengchun Chen, Changzhou (CN); Lu Tian, Changzhou (CN); Meijun Wei, Changzhou (CN)

(73) Assignee: Changzhou University, Changzhou (CN)

( * ) Notice: Subject to any disclaimer, the term of this patent is extended or adjusted under 35 U.S.C. 154(b) by 701 days.

(21) Appl. No.: 17/875,378

(22) Filed: Jul. 27, 2022

(65) Prior Publication Data

US 2023/0159699 A1 May 25, 2023

(30) Foreign Application Priority Data

Nov. 25, 2021 (CN) .......................... 202111412756.3

(51) Int. Cl.
C08G 63/08 (2006.01)
C07F 11/00 (2006.01)
C08G 63/82 (2006.01)
C08G 63/83 (2006.01)

(52) U.S. Cl.
CPC .......... *C08G 63/823* (2013.01); *C07F 11/005* (2013.01); *C08G 63/08* (2013.01); *C08G 63/83* (2013.01)

(58) Field of Classification Search
CPC ........ C08G 63/08; C08G 63/83; C07F 11/005
See application file for complete search history.

(56) References Cited

U.S. PATENT DOCUMENTS 11,878,288 B2 * 1/2024 Chen ........................ B01J 23/88

FOREIGN PATENT DOCUMENTS

CN 107501535 * 12/2017

OTHER PUBLICATIONS

Labet M, Thielemans C. et al., Synthesis of polycaprolactone: a review, Chem. Soc. Rev., 2009, 38, 3484-3504.
Chen S.-C., Zhang F.-H., Huang K.-L., Tian, F., Zhang Z.-H., Zhou R., Feng X.-J., Zhou X., He M.-Y., Gu J., Chen Q., Wu, C.-D. , The crucial roles of guest water in a biocompatible coordination network in the catalytic ring-opening polymerization of cyclic esters: a new mechanistic perspective, Chem. Sci. 2020, 11, 3345-3354.
Naz F, Mumtaz F, Chaemchuen S, Verpoort F. , Bulk Ring-Opening Polymerization of ϵ-Caprolactone by Zeolitic Imidazolate Framework, Catal. Lett. 2019, 149, 2132-2141, Catal. Lett. 2019, 149, 2132-2141.
Shen N., Tian F., Chang J., Huang K.-L., Zhang Z.-H., Feng X., Gu J., Chen C.-C., He M.-Y., Chen Q. , An unprecedented cobalt(ii)-containing Wells-Dawson-type tungstovanadate-based metal-organic framework as an efficient catalyst for ring-opening polymerization of ϵ-caprolactone, Crystengcomm 2020, 22, 3656-3663.

* cited by examiner

*Primary Examiner* — Gregory Listvoyb
(74) *Attorney, Agent, or Firm* — IDEA Intellectual Limited; Sam T. Yip

(57) ABSTRACT

An organic frame material having zinc containing isopoly-molybdic acid metal, a method of manufacturing the same, and the application thereof are provided. The organic frame material having zinc containing isopoly-molybdic acid metal includes a three-dimensional network structure in which the zinc ions coordinate with 2,3,5,6-tetrafluoro-bis (1,2,4-triazole-1-methyl) benzene ligands and trinuclear molybdate anions. The organic frame material having zinc containing isopoly-molybdic acid metal exhibits high catalytic activity, thermal stability, low toxicity, ease of synthetization and use, and strong reproducibility.

9 Claims, 3 Drawing Sheets

ORGANIC FRAME MATERIAL HAVING ZINC CONTAINING ISO-MOLYBDIC ACID METAL, METHOD OF MANUFACTURING THE SAME, AND APPLICATION THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE OF RELATED APPLICATION

This application is claiming priority from Chinese patent application number 202111412756.3 filed on Nov. 25, 2021, the disclosures of which are incorporated herein by reference in their entirety.

FIELD OF THE INVENTION

The invention relates to the technical field of catalysts. In particular, it relates to an organic frame material having zinc containing isopoly-molybdic acid metal, a method of manufacturing the same, and the application thereof.

BACKGROUND OF THE INVENTION

Polycaprolactone (PCL) is an important thermoplastic semi-crystalline aliphatic polyester. The PCL structural repeating unit has five non-polar methylene groups and one polar ester group. PCL exhibits good flexibility and processability, and the product of PCL has shape memory. Due to the broad range of raw materials that can be used to produce PCL, it can have high biocompatibility, ample mechanical strength and excellent capability to flexibly and extensively deform. PCL has been widely used as an internal bone graft fixation tool, an external stabilizing structure for fractures, a controlled-release drug carrier, and many more functions. In addition, by modifying PCL to improve its hydrophilicity and degradation rate, its application range can be expanded. For example, PCL may be used as organ and tissue repair material, as artificial skin tissue, and in cell engineering.

There are two methods to synthesize PCL. One approach is self-condensation of the 6-hydroxycaproic acid, and the other is ring-opening polymerization of F-caprolactone. Compared with polycondensation, no water is generated during ring-opening polymerization. The resulting PCL obtained from ring-opening polymerization has a higher molecular weight and can reduce the occurrence of side reactions such as chain transfer. PCL has a narrow molecular weight distribution and therefore causes fewer side reactions. PCL also has an easier-to-control molecular weight (Labet M, Thielemans W. *Chem. Soc. Rev.* 2009, 38, 3484-3504). Metal complex catalysts are efficient at catalyzing the ring-opening polymerization of F-caprolactone when manufacturing PCL. Organotin and aluminum compounds are popular industrial catalysts to prepare PCL in the ring-opening polymerization. They have high catalytic activity, but there are also limitations, such as serious side reactions in the catalytic process, wide molecular weight distribution of polyester, low catalyst stability, and cytotoxicity caused by the catalyst residue. These limitations restrict the application of PCL in the field of biomedicine.

In recent years, it has been found that metal organic frame materials can be used as catalysts to initiate the ring-opening polymerization of glycolide, lactide, and ε-caprolactone. These catalysts have moderate activity. (Chen S.-C., Zhang F.-H., Huang K.-L., Tian, F., Zhang Z.-H., Zhou R., Feng X.-J., Zhou X., He M.-Y., Gu J., Chen Q., Wu, C.-D. *Chem. Sci.* 2020, 11, 3345-3354; Naz F, Mumtaz F, Chaemchuen S, Verpoort F. *Catal. Lett.* 2019, 149, 2132-2141). The heteropoly acid metal shows some catalytic activity in the ring-opening polymerization of F-caprolactone. (Shen N., Tian F., Chang J., Huang K.-L., Zhang Z.-H., Feng X., Gu J., Chen C.-C., He M.-Y., Chen Q. *Crystengcomm* 2020, 22, 3656-3663). However, there is a lack of studies about the application of metal organic frame materials in the ring-opening polymerization of ε-caprolactone to manufacture high molecular weight PCL. Therefore, there is a need for organic frame materials having iso-polyoxometalates to synthesize PCL with high molecular weight and a narrow molecular weight distribution. This approach has a broad range of applications, including research on biomedical degradable polymer materials.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems to provide a highly effective and low-toxicity zinc-complexed compound that catalyzes the ring-opening polymerization of ε-caprolactone when manufacturing PCL. The present invention provides an organic frame material having zinc containing isopoly-molybdic acid metal, a method of manufacturing thereof, and a catalysis of the ring-opening polymerization of ε-caprolactone by the organic frame material to prepare PCL. This organic frame material with zinc containing isopoly-molybdic acid metal has thermal stability, a convenient synthesis method, strong reproducibility, and higher catalytic activity in the bulk ring-opening of ε-caprolactone. The resulting polycaprolactone has an average molecular weight of 60,000-90,000 and a molecular weight distribution index between 1.3 and 1.5. The resulting polycaprolactone can be used for medical polymer materials.

Accordingly, one aspect of the present invention provides an organic frame material having a zinc containing isopoly-molybdic acid metal. The organic frame material having a zinc containing isopoly-molybdic acid metal includes a three-dimensional network structure having zinc ions coordinated with 2,3,5,6-tetrafluoro-bis (1,2,4-triazole-1-methyl) benzene ligands and trinuclear molybdate anions. The chemical formula of the three-dimensional network structure is [Zn (tfbtb) ($Mo_3O_{10}$) ($H_2O$)]. The tfbtb is 2,3,5,6-tetrafluoro-bis (1,2,4-triazole-1-methyl) benzene ligand, and $Mo_3O_{10}$ is a trinuclear molybdate anion.

In a further embodiment of the present invention, the three-dimensional network structure is a triclinic crystal system, the space group is P−1, the molecular formula is $C_{12}H_{10}F_4Mo_3N_6O_{11}Zn$, the molecular weight is 843.45, the cell parameters are a=8.0433(4) Å, b=8.9974(8) Å, c=15.5979(9) Å, α=105.972(7)°, β=92.898(4)°, γ=99.595(6) °, and the cell volume is 1064.49(13) Å$^3$, Z=2.

Another aspect of the present invention provides a method to manufacture the organic frame material having a zinc containing isopoly-molybdic acid metal as previously discussed. First, a composition is provided. The composition includes zinc salt, sodium molybdate dihydrate and 2,3,5,6-tetrafluoro-bis (1,2,4-triazole-1-methyl) benzene, and a solvent is provided. Next, the composition is heated to obtain the organic frame material having a zinc containing isopoly-molybdic acid metal.

In a further embodiment of the present invention, the molar ratio between the zinc salt and the sodium molybdate dihydrate is between 1:1 and 1:2, the molar ratio between the 2,3,5,6-tetrafluoro-bis (1,2,4-triazole-1-methyl) benzene and the zinc salt is between 1:3 and 1:9, and the molar ratio between the 2,3,5,6-tetrafluoro-bis (1,2,4-triazole-1-methyl) benzene and the sodium molybdate dihydrate is between 1:5 and 1:15.

In a further embodiment of the present invention, the zinc salt is selected from one or more of zinc nitrate, zinc acetate, and zinc chloride.

In a further embodiment of the present invention, the solvent is water, and each 0.07 mmol of 2,3,5,6-tetrafluoro-bis (1,2,4-triazole-1-methyl) benzene is disposed in 3 to 10 ml of water.

In a further embodiment of the present invention, the heating has a heating temperature ranging between 16° and 200° C. and a heating time ranging between 24 and 72 hours.

Another aspect of the present invention provides a method to catalyze ring-opening polymerization of ε-caprolactone for manufacturing polycaprolactone. A reaction of bulk ring-opening polymerization between the organic frame material having the zinc containing isopoly-molybdic acid metal as previously discussed and ε-caprolactone under a reaction temperature to obtain polycaprolactone is performed.

In a further embodiment of the present invention, the molar ratio between the organic frame material having the zinc containing isopoly-molybdic acid metal and ε-caprolactone is 1:500 to 1:5,000, and the reaction temperature for the bulk ring-opening polymerization ranges between 12° and 180° C., and the reaction time for the bulk ring-opening polymerization ranges between 1 and 12 hours Another aspect of the present invention provides a polycaprolactone manufactured by the method as previously discussed. The average molecular weight of the obtained polycaprolactone is between 60,000 and 90,000, the molecular weight distribution index is between 1.3 and 1.5, and the obtained polycaprolactone can be incorporated into medical low-temperature thermoplastic plates.

In comparison with the conventional catalyst, the invention has the following advantages: The organic frame material having zinc containing isopoly-molybdic acid metal exhibits high catalytic activity, good thermal stability, low toxicity, convenient synthesis and strong reproducibility.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Example 1

Zinc nitrate (178.5 mg, 0.6 mmol), sodium molybdate dihydrate (241.9 mg, 1.0 mmol), tfbtb (31.2 mg, 0.1 mmol) and deionized water (5 ml) are added to a 15 ml polytetrafluoroethylene-lined autoclave. After a reaction takes place at 180° C. for 48 hours, the composition is slowly cooled to room temperature at a rate of 5° C./hour to obtain colorless block crystals with a yield of 62% (52.3 mg, based on tfbtb).

The properties of the organic frame material having zinc containing isopoly-molybdic acid metal prepared in Example 1 are characterized as follows.

Figure 1:
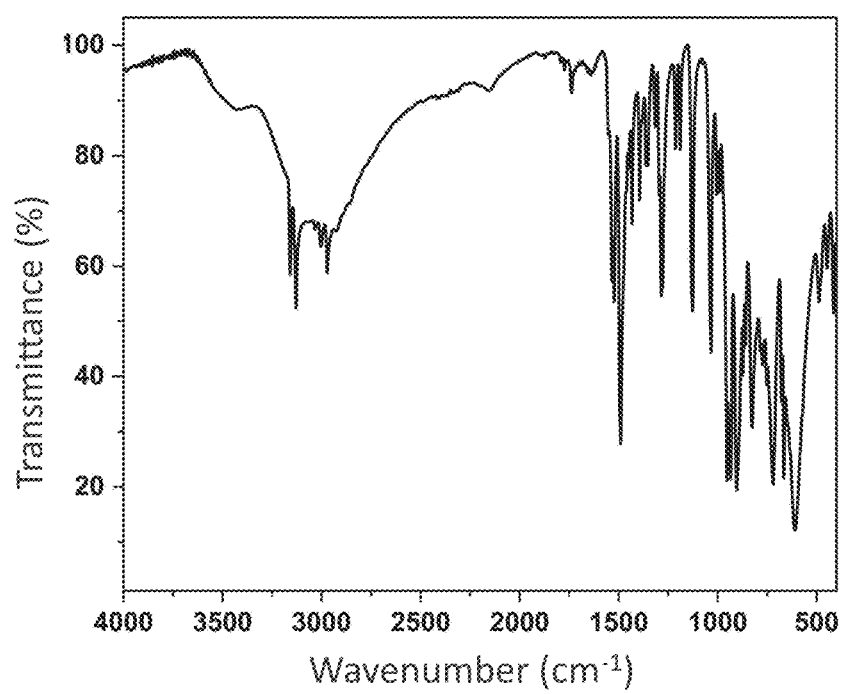
FIG. 1 is an infrared spectrum of an organic frame material having zinc containing isopoly-molybdic acid metal according to Example 1 of the present invention.

A Nicolet ESP 460 instrument is used to measure the material's infrared data. As shown in FIG. 1, infrared data (KBr, cm$^{-1}$) are: 3448 br, 3160 w, 3121 w, 2971 w, 1637 w, 1533 w, 1525 w, 1491 s, 1432 w, 1396 w, 1384 w, 1362 w, 1285 m, 1213 w, 1190 w, 1128 m, 1032 m, 1005 w, 991 w, 991 w, 953 s, 908 s, 850 w, 827 s, 786 m, 751 m, 718 s, 676 s, 667 s, 487 m, 448 m.

Figure 2:
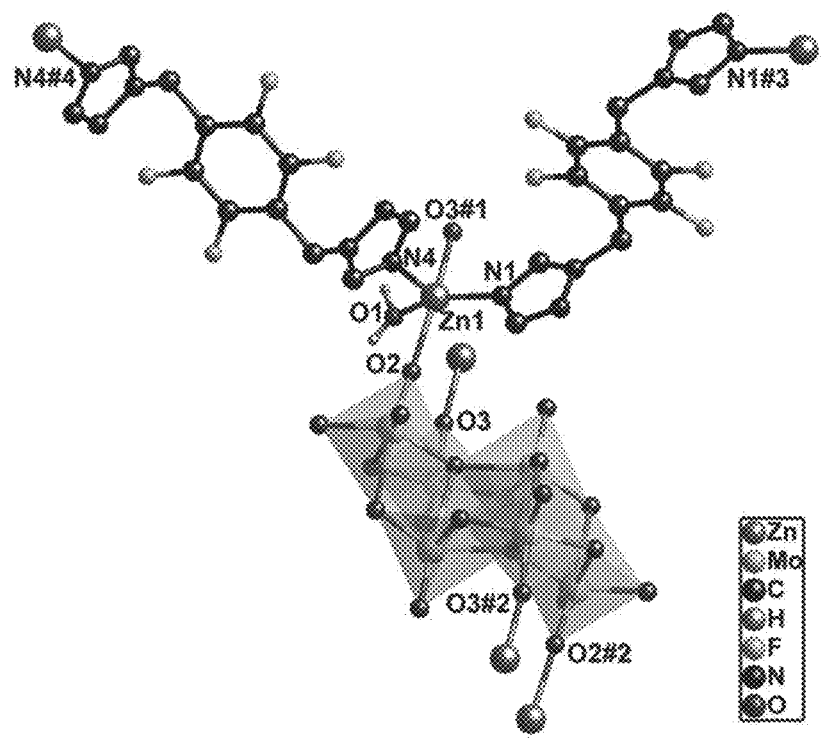
FIG. 2 shows the coordination environment of an organic frame material having zinc containing isopoly-molybdic acid metal according to Example 1 of the present invention.
Figure 3:
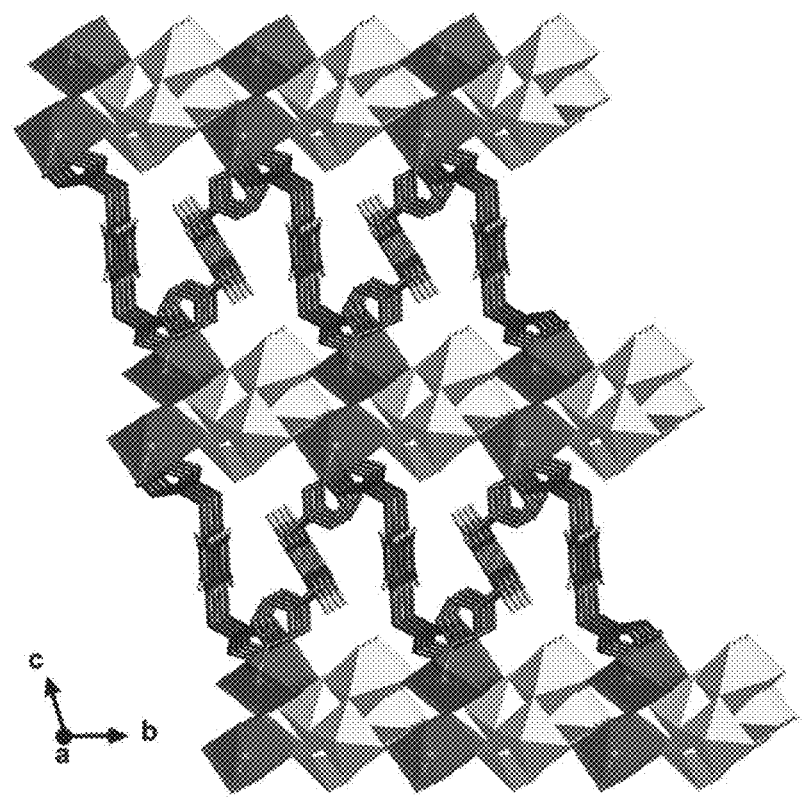
FIG. 3 is a three-dimensional network structure diagram of an organic frame material having zinc containing isopoly-molybdic acid metal according to Example 1 of the present invention.

The crystal structure is determined by a Bruker Apex II CCD diffractometer. The diffraction points are collected under 293(2) K with graphite monochromated Mo Kα ray (λ=0.71073 Å) and ω scanning. The collected data are restored by a SAINT program, and semi-empirical absorption correction is performed by SADABS. The structure analysis and refinement are completed by SHELXS and SHELXL of SHELXTL program respectively. $F^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2 or N—H, 1.2 times). Table 1 shows detailed crystal measurement data. FIG. 2 shows the coordination environment of the organic frame material having zinc containing isopoly-molybdic acid metal. FIG. 3 shows the three-dimensional network structure of the organic frame material having zinc containing isopoly-molybdic acid metal.

TABLE 1

| | |
|---|---|
| Molecular formula | $C_{12}H_{10}F_4Mo_3N_6O_{11}Zn$ |
| Molecular weight | 843.45 |
| Crystal size | 0.23 mm × 0.22 mm × 0.18 mm |
| Crystallographic system | Triclinic |
| Space group | P $\bar{1}$ |
| Cell parameters | a = 8.0433(4) Å |
| | b = 8.9974(8) Å |
| | c = 15.5979(9) Å |
| | α = 105.972(7)° |
| | β = 92.898(4)° |
| | γ = 99.595(6)° |
| Volume | 1064.49 (13) Å$^3$ |
| Number of repeating units in cell | 2 |
| Density (calculated) | 2.631 mg m$^{-3}$ |
| Absorption coefficient | 2.947 |
| Absorption correction | Semi-empirical |
| Refinement | Least square |
| $F^2$ base fit | 1.044 |
| Final R factor [I > 2σ(I)] | $R_1$ = 0.0522 |
| R factor (all data) | $R_1$ = 0.0571 |
| Residual error | 2.553 eÅ$^{-3}$, −1.927 eÅ$^{-3}$ |

Figure 4:
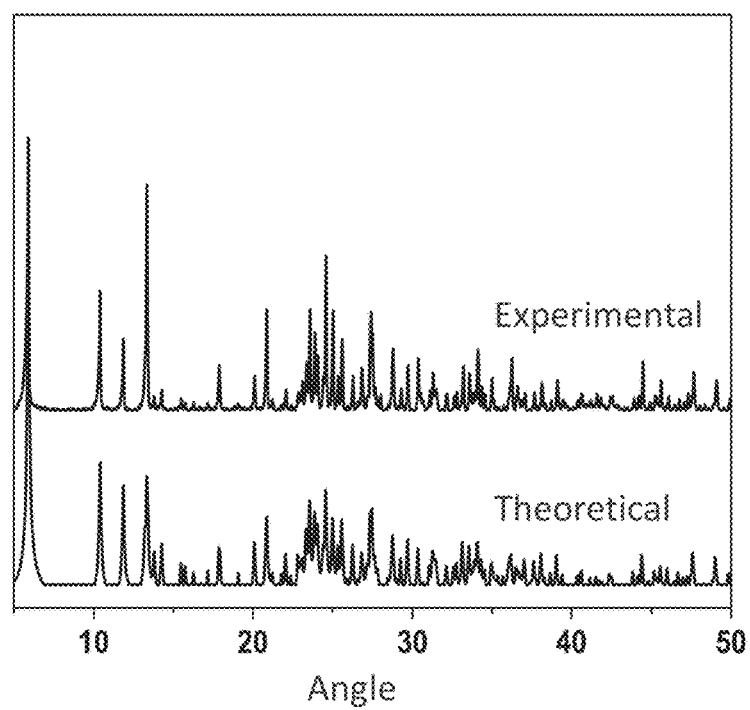
FIG. 4 is the powder diffraction diagram of an organic frame material having zinc containing isopoly-molybdic acid metal according to Example 1 of the present invention.

A RIGAKU d/max-2500 instrument is used to characterize the phase purity of the organic frame material having zinc containing isopoly-molybdic acid metal, as shown in FIG. 4. The powder diffraction diagram of the organic frame material having zinc containing isopoly-molybdic acid metal shows that it has a reliable phase purity, which ensures its catalytic activity in the ring-opening copolymerization of ε-caprolactone.

Figure 5:
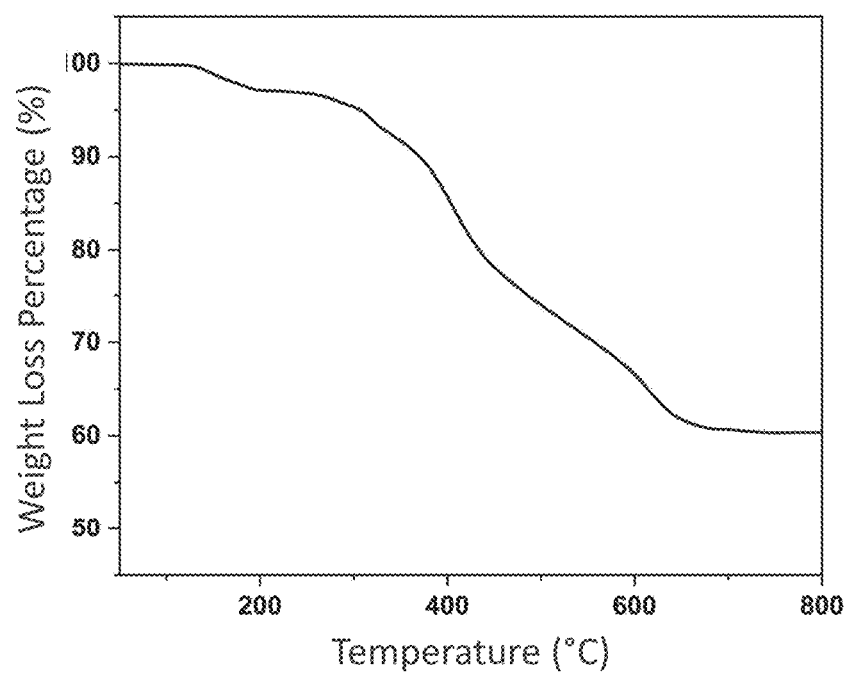
FIG. 5 is the thermogravimetric diagram of an organic frame material having zinc containing isopoly-molybdic acid metal according to Example 1 of the present invention.

The thermal stability of the organic frame material having zinc containing isopoly-molybdic acid metal can be characterized by thermogravimetric analyzer (instrument model: NETZSCH/TG 209 F3). FIG. 5 shows the thermogravimetric diagram of the organic frame material having zinc containing isopoly-molybdic acid metal. The results show that the organic frame material having zinc containing isopoly-molybdic acid metal has high thermal stability even up to 250° C.

Example 2

Zinc chloride (81.78 mg, 0.6 mmol), sodium molybdate dihydrate (241.9 mg, 1.0 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 52.2% (44 mg, based on tfbtb).

Example 3

Zinc acetate (110.1 mg, 0.6 mmol), sodium molybdate dihydrate (241.9 mg, 1.0 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 53.7% (45.3 mg, based on tfbtb).

Example 4

Zinc nitrate (59.5 mg, 0.5 mmol), sodium molybdate dihydrate (241.9 mg, 1.0 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals with a yield of 48.3% (40.7 mg, based on tfbtb).

Example 5

Zinc nitrate (208.3 mg, 1.0 mmol), sodium molybdate dihydrate (241.9 mg, 1.0 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals with a yield of 60.6% (51.1 mg, based on tfbtb).

Example 6

Zinc nitrate (59.5 mg, 0.6 mmol), sodium molybdate dihydrate (120.9 mg, 0.5 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 38.3% (32.3 mg, based on tfbtb).

Example 7

Zinc nitrate (59.5 mg, 0.6 mmol), sodium molybdate dihydrate (362.8 mg, 1.5 mmol), tfbtb (31.2 mg, 0.1 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals with a yield of 60.3% (50.8 mg, based on tfbtb).

Example 8

Zinc nitrate (59.5 mg, 0.6 mmol), sodium molybdate dihydrate (241.9 mg, 1.0 mmol), tfbtb (62.4 mg, 0.2 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 60.7% (51.2 mg, based on tfbtb).

Example 9

Zinc nitrate (59.5 mg, 0.6 mmol), sodium molybdate dihydrate (241.9 mg, 1.0 mmol), tfbtb (21.8 mg, 0.07 mmol) and deionized water (5 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 42.2% (35.6 mg, based on tfbtb).

Example 10

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 160° C. for 24 hours to undergo reaction, it is slowly cooled to room temperature at a rate of 5° C./hour to obtain colorless block crystals in a yield of 33.7% (28.4 mg, based on tfbtb).

Example 11

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 160° C. for 48 hours to undergo reaction, it is slowly cooled to room temperature at a rate of 5° C./hour to obtain colorless block crystals in a yield of 39.7% (33.5 mg, based on tfbtb).

Example 12

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 160° C. for 72 hours to undergo reaction, it is slowly cooled to room temperature at a rate of 5° C./hour to obtain colorless block crystals in a yield of 48.6% (41 mg, based on tfbtb).

Example 13

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 200° C. for 24 hours to undergo reaction, it is slowly cooled to room temperature at a rate of 5° C./hour to obtain colorless block crystals in a yield of 40.2% (33.9 mg, based on tfbtb).

Example 14

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 200° C. for 48 hours to undergo reaction, it is slowly cooled to room temperature at a rate of 5° C./hour to obtain colorless block crystals in a yield of 46.1% (38.9 mg, based on tfbtb).

Example 15

Zinc nitrate (178.5 mg, 0.6 mmol), sodium molybdate dihydrate (241.9 mg, 1.0 mmol), tfbtb (20 mg, 0.1 mmol) and deionized water (5 ml) are added to a 15 ml polytetrafluoroethylene-lined autoclave. After this combination is heated at 200° C. for 72 hours to undergo reaction, it is slowly cooled to room temperature at a rate of 5° C./hour to obtain colorless block crystals in a yield of 51.7% (43.6 mg, based on tfbtb).

Example 16

Zinc nitrate (178.5 mg, 0.6 mmol), sodium molybdate dihydrate (241.9 mg, 1.0 mmol), tfbtb (20 mg, 0.1 mmol) and deionized water (3 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 46.1% (38.9 mg, based on tfbtb).

Example 17

Zinc nitrate (178.5 mg, 0.6 mmol), sodium molybdate dihydrate (241.9 mg, 1.0 mmol), tfbtb (20 mg, 0.1 mmol) and deionized water (3 ml) are added to a 15 ml polytetrafluoroethylene-lined autoclave. After this combination is heated at 200° C. for 48 hours to undergo reaction, it is slowly cooled to room temperature at a rate of 5° C./hour to obtain colorless block crystals in a yield of 52.8% (44.5 mg, based on tfbtb).

Example 18

Zinc nitrate (178.5 mg, 0.6 mmol), sodium molybdate dihydrate (241.9 mg, 1.0 mmol), tfbtb (20 mg, 0.1 mmol) and deionized water (10 ml) are added to a 15 ml polytetrafluoroethylene-lined autoclave. After this combination is heated at 180° C. for 48 hours to undergo reaction, it is slowly cooled to room temperature at a rate of 5° C./hour to obtain colorless block crystals in a yield of 59.7% (50.4 mg, based on tfbtb).

Example 19

Zinc nitrate (178.5 mg, 0.6 mmol), sodium molybdate dihydrate (241.9 mg, 1.0 mmol), tfbtb (20 mg, 0.1 mmol) and deionized water (10 ml) are added to a 15 ml polytetrafluoroethylene-lined autoclave. After this combination is heated at 200° C. for 48 hours to undergo reaction, it is slowly cooled to room temperature at a rate of 5° C./hour to obtain colorless block crystals in a yield of 57.1% (48.2 mg, based on tfbtb).

Comparative Example 1

Zinc nitrate is replaced with other metal salts (such as copper nitrate, copper acetate, cobalt nitrate, cobalt acetate, magnesium nitrate or calcium nitrate, 0.6 mmol). The other metal salts, sodium molybdate dihydrate (241.9 mg, 1.0 mmol), tfbtb (20 mg, 0.1 mmol) and deionized water (5 ml) are added into a 15 ml polytetrafluoroethylene-lined autoclave, and they are slowly cooled to room temperature at a rate of 5° C./hour, after being heated at 180° C. for 48 hours. The result is amorphous powders, and no crystal samples are suitable for X-ray single crystal analysis.

Comparative Example 2

Tfbtb is replaced with other nitrogen heterocyclic ligands (such as imidazole, benzimidazole, pyridine, pyrrole, pyrimidine or quinoline, 0.1 mmol). The other nitrogen heterocyclic ligands, zinc nitrate (178.5 mg, 0.6 mmol), sodium molybdate dihydrate (241.9 mg, 1.0 mmol) and deionized water (5 ml) are added to a 15 ml polytetrafluoroethylene-lined autoclave. After this combination is heated at 180° C. for 48 hours to undergo reaction, they are slowly cooled to room temperature at a rate of 5° C./hour. The result is amorphous powders, and no crystal samples are suitable for X-ray single crystal analysis.

Comparative Example 3

Sodium molybdate dihydrate is replaced with other molybdenum salts (such as phosphomolybdic acid or ammonium molybdate, 0.6 mmol). The other molybdenum salts, zinc nitrate (178.5 mg, 0.6 mmol), tfbtb (31.2 mg, 0.1 mmol) and deionized water (5 ml) are added into a 15 ml polytetrafluoroethylene-lined autoclave. After this combination is heated at 180° C. for 48 hours to undergo reaction, it is slowly cooled to room temperature at a rate of 5° C./hour. The result is amorphous powders, and no crystal samples are suitable for X-ray single crystal analysis.

Example 20

The organic frame material having zinc containing isopoly-molybdic acid metal of Example 1 is used as a catalyst for the ε-caprolactone in the preparation of PCL.

2100 mg ε-caprolactone (18 mmol) and 15.2 mg catalyst of the organic frame material having zinc containing isopoly-molybdic acid metal (0.018 mmol) are added to Schlenk reaction tubes. The reaction is carried out at a constant 140° C. for 3 hours. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product.

Figure 6:
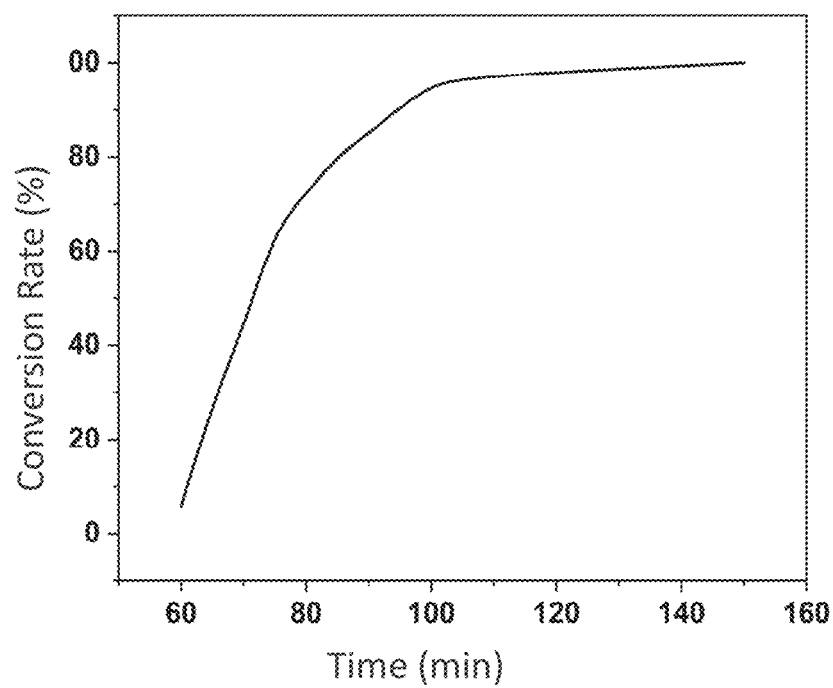
FIG. 6 shows a diagram of conversion rate and reaction time for a ring-opening polymerization of ε-caprolactone that is catalyzed by an organic frame material having zinc containing isopoly-molybdic acid metal according to Example 1 of the present invention.

The relationship between the conversion rate and reaction time of F-caprolactone is tested by $^1$H NMR quantitative analysis (instrument model: Bruker AVANCE 400 MHz), as shown in FIG. 6. It can be seen from FIG. 6 that when the reaction time reaches 150 minutes, ε-caprolactone has been completely converted (conversion rate 100%).

Measurement of the molecular weight of PCL: 7.0 mg of PCL is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated average molecular weight is approximately 89,294, and the molecular weight distribution index is approximately 1.28.

Test conditions: The column temperature is 40° C. The eluent is tetrahydrofuran. The flow rate is 0.6 ml/min. The detector is a RID-10A detector. Calibration: four different standardized polystyrene having molecular weight between ranging between 2,000 and 100,000 are used.

Example 21

2100 mg ε-caprolactone (18 mmol) and 15.2 mg catalyst of the organic frame material having zinc containing isopoly-molybdic acid metal (0.018 mmol) are added to Schlenk reaction tubes. The reaction is carried out at a constant 140° C. for 1 hour. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 62,415, and the molecular weight distribution index is approximately 1.39.

Example 22

2100 mg ε-caprolactone (18 mmol) and 15.2 mg catalyst of the organic frame material having zinc containing isopoly-molybdic acid metal (0.018 mmol) are added to Schlenk reaction tubes. The reaction is carried out at a constant 140° C. for 12 hours. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 81,597, and the molecular weight distribution index is approximately 1.43.

Example 23

2100 mg ε-caprolactone (18 mmol) and 15.2 mg catalyst of the organic frame material having zinc containing isopoly-molybdic acid metal (0.018 mmol) are added to Schlenk reaction tubes. The reaction is carried out at a constant 120° C. for 3 hours. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 61,503, and the molecular weight distribution index is approximately 1.47.

Example 24

2100 mg ε-caprolactone (18 mmol) and 15.2 mg catalyst of the organic frame material having zinc containing isopoly-molybdic acid metal (0.018 mmol) are added to Schlenk reaction tubes. The reaction is carried out at a constant 180° C. for 3 hours. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 82,310, and the molecular weight distribution index is approximately 1.48.

Example 25

2100 mg ε-caprolactone (18 mmol) and 30.4 mg catalyst of the organic frame material having zinc containing isopoly-molybdic acid metal (0.036 mmol) are added to Schlenk reaction tubes. The reaction is carried out at a constant 140° C. for 3 hours. After the reaction is completed, it is cooled to room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 75,796, and the molecular weight distribution index is approximately 1.44.

Example 26

2100 mg ε-caprolactone (18 mmol) and 3.0 mg catalyst of the organic frame material having zinc containing isopoly-molybdic acid metal (0.036 mmol) are added to Schlenk reaction tubes. The reaction is carried out at a constant 140° C. for 3 hours. After the reaction is completed, it is cooled to the room temperature. The product is dissolved in 20 ml of methylene chloride. The catalyst (organic frame material having zinc containing isopoly-molybdic acid metal) is recovered by centrifugation. Then, methanol is added to the filtrate to precipitate the polymer. The polymer is dried in a vacuum at 50° C. to obtain the white PCL product. The $^1$H NMR quantitative analysis shows that the conversion rate of ε-caprolactone is 100%.

The molecular weight measurement method as discussed in Example 20 is used. The calculated average molecular weight of the PCL is approximately 82,681, and the molecular weight distribution index is approximately 1.39.

Comparative Example 4

2100 mg ε-caprolactone (18 mmol) and 3.4 mg catalyst of the organic frame material having zinc containing isopoly-molybdic acid metal (0.018 mmol) are added to Schlenk reaction tubes. The reaction is carried out at a constant 140° C. for 3 hours. The $^1$H NMR quantitative analysis shows that the conversion rate of F-caprolactone is 49.1%.

The molecular weight measurement method as discussed in Example 20 is used. The calculated average molecular weight of the PCL is approximately 10,194, and the molecular weight distribution index is approximately 1.67.

Comparative Example 5

2100 mg ε-caprolactone (18 mmol) and 8.4 mg tfbtb (0.018 mmol) are added to Schlenk reaction tubes. The reaction is carried out at a constant 140° C. for 3 hours. The $^1$H NMR quantitative analysis shows that tfbtb has very low catalytic activity in relation to the ring-opening polymerization of caprolactone. The conversion rate of the monomer is lower than 5%.

The molecular weight measurement method as discussed in Example 20 is used. The calculated average molecular weight of the PCL is smaller than 700, and the molecular weight distribution index is approximately 1.06.

Comparative Example 6

2100 mg ε-caprolactone (18 mmol) and 8.4 mg sodium molybdate dihydrate (0.018 mmol) are added to Schlenk reaction tubes. The reaction is carried out at a constant 140° C. for 3 hours. The $^1$H NMR quantitative analysis shows that the caprolactone does not convert, and no PCL is obtained.

The present invention provides an organic frame material having zinc containing isopoly-molybdic acid metal for catalyzing the open ring polymerization of ε-caprolactone. The present invention relates to the field of catalysts of caprolactone. The chemical formula of the catalyst is [Zn(tfbtb)(Mo$_3$O$_{10}$)(H$_2$O)]. In the formula, tfbtb is 2,3,5,6-tetrafluoro-bis (1,2,4-triazole-1-methyl) benzene ligand, and Mo$_3$O$_{10}$ is a trinuclear molybdate anion. In the present invention, zinc salt, sodium molybdate dihydrate, 2,3,5,6-tetrafluoro-bis (1,2,4-triazole-1-methyl) benzene are added in the distilled water. Heat reaction is carried out in a closed condition to obtain a three-dimensional network structure of organic frame material having a zinc containing isopoly-molybdic acid metal. The approach allows high yield and strong reproducibility, and the resulting crystals show high purity. The organic frame material having a zinc containing isopoly-molybdic acid metal is capable of catalyzing the open-ring polymerization of ε-caprolactone in the absence of the alcohol initiator. The resulting polycaprolactone has a molecular weight exceeding 60,000, and the molecular weight distribution index is smaller than 1.4. The resulting polycaprolactone can be used for medical polymer materials.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (m) positioned along the same plane, for example, within 10 m, within 5 m, within 1 m, or within 0.5 m located along the same plane. When reference is made to "substantially" the same numerical value or characteristic, the term may refer to a value within ±10%, ±5%, ±1%, or ±0.5% of the average of the values.

What is claimed is:

1. An organic frame material having a zinc containing isopoly-molybdic acid metal comprising:
 a three-dimensional network structure having zinc ions coordinated with 2,3,5,6-tetrafluoro-bis (1,2,4-triazole-1-methyl) benzene ligands and trinuclear molybdate anions, the chemical formula of the three-dimensional network structure being [Zn (tfbtb) ($Mo_3O_{10}$) ($H_2O$)], wherein tfbtb is 2,3,5,6-tetrafluoro-bis (1,2,4-triazole-1-methyl) benzene ligand, and $Mo_3O_{10}$ is a trinuclear molybdate anion.

2. The organic frame material of claim 1, wherein the three-dimensional network structure is a triclinic crystal system, the space group is P–1, the molecular formula is $C_{12}H_{10}F_4Mo_3N_6O_{11}Zn$, the molecular weight is 843.45, cell parameters are a=8.0433(4) Å, b=8.9974(8) Å, c=15.5979(9) Å, $\alpha$=105.972(7)°, $\beta$=92.898(4)°, $\gamma$=99.595(6)°, and cell volume is 1064.49(13) Å$^3$, Z=2.

3. A method of manufacturing the organic frame material having a zinc containing isopoly-molybdic acid metal of claim 1 comprising:
 providing a composition, the compositing comprising zinc salt, sodium molybdate dihydrate, 2,3,5,6-tetrafluoro-bis (1,2,4-triazole-1-methyl) benzene and a solvent; and
 heating the composition to obtain the organic frame material having a zinc containing isopoly-molybdic acid metal.

4. The method of claim 3, wherein the molar ratio between the zinc salt and the sodium molybdate dihydrate is between 1:1 and 1:2, the molar ratio between the 2,3,5,6-tetrafluoro-bis (1,2,4-triazole-1-methyl) benzene and the zinc salt is between 1:3 and 1:9, and the molar ratio between the 2,3,5,6-tetrafluoro-bis (1,2,4-triazole-1-methyl) benzene and the sodium molybdate dihydrate is between 1:5 and 1:15.

5. The method of claim 3, wherein the zinc salt is selected from the group consisting of one or more of zinc nitrate, zinc acetate, and zinc chloride.

6. The method of claim 5, wherein the solvent is water, and each 0.07 mmol of 2,3,5,6-tetrafluoro-bis (1,2,4-triazole-1-methyl) benzene is disposed in 3 to 10 ml of water.

7. The method of claim 3, wherein the heating has a heating temperature ranging between 16° and 200° C. and a heating time ranging between 24 and 72 hours.

8. A method of catalyzing ring opening polymerization of ε-caprolactone for manufacturing polycaprolactone comprising:
 effecting a reaction of bulk ring-opening polymerization between the organic frame material having the zinc containing isopoly-molybdic acid metal of claim 1 and ε-caprolactone under a reaction temperature to obtain polycaprolactone.

9. The method of claim 8, wherein the molar ratio between the organic frame material having the zinc containing isopoly-molybdic acid metal and ε-caprolactone is 1:500 to 1:5000, and the reaction temperature for the bulk ring-opening polymerization ranges between 12° and 180° C., and a reaction time for the bulk ring-opening polymerization ranges between 1 and 12 hours.

* * * * *